(12) United States Patent
Worrall et al.

(10) Patent No.: US 11,596,011 B2
(45) Date of Patent: Feb. 28, 2023

(54) DUAL CONNECTIVITY NETWORK

(71) Applicant: Alcatel Lucent, Boulogne Billancourt (FR)

(72) Inventors: Chandrika Worrall, Swindon (GB); Sudeep Palat, Swindon (GB)

(73) Assignee: Nokia Technologies OY, Espoo (FI)

( * ) Notice: Subject to any disclaimer, the term of this patent is extended or adjusted under 35 U.S.C. 154(b) by 676 days.

(21) Appl. No.: 15/127,523

(22) PCT Filed: Mar. 12, 2015

(86) PCT No.: PCT/EP2015/055161
§ 371 (c)(1),
(2) Date: Sep. 20, 2016

(87) PCT Pub. No.: WO2015/140038
PCT Pub. Date: Sep. 24, 2015

(65) Prior Publication Data
US 2017/0181216 A1 Jun. 22, 2017

(30) Foreign Application Priority Data
Mar. 21, 2014 (EP) .................................. 14305405

(51) Int. Cl.
*H04W 76/15* (2018.01)
*H04W 76/19* (2018.01)
*H04W 84/04* (2009.01)

(52) U.S. Cl.
CPC ........... *H04W 76/15* (2018.02); *H04W 76/19* (2018.02); *H04W 84/045* (2013.01)

(58) Field of Classification Search
CPC ............. H04W 76/025; H04W 76/028; H04W 84/045
See application file for complete search history.

(56) References Cited

U.S. PATENT DOCUMENTS 9,713,044 B2 * 7/2017 Yamada ............ H04W 36/0072
2010/0027507 A1 * 2/2010 Li ..................... H04W 36/0058
370/331

(Continued)

FOREIGN PATENT DOCUMENTS

WO WO 2013/144614 A1 10/2013

OTHER PUBLICATIONS

Kyocera, "RLF issues in dual-connectivity," $3^{rd}$ Generation Partnership Project (3GPP), 3GPP TSG-RAN WG2 #83bis, R2-133503, pp. 1-4, XP050719218, Ljubljana, Slovenia, Oct. 7-11, 2013.

(Continued)

*Primary Examiner* — Khaled M Kassim
*Assistant Examiner* — Berhanu D Belete
(74) *Attorney, Agent, or Firm* — Lippes Mathias LLP

(57) ABSTRACT

A user equipment method, user equipment, a base station method, a base station and computer program products are disclosed. The user equipment method, comprises in response to a radio resource control connection re-establishment procedure being initiated when operating in a dual-connectivity mode, retaining configuration information of at least one data bearer utilised in the dual-connectivity mode for subsequent re-use. In this way, rather than losing all the data radio bearer configuration during the RRC connection re-establishment procedure, some of this bearer configuration is retained so that it may be subsequently re-used, thereby improving the speed and efficiency of the RRC connection re-establishment procedure.

20 Claims, 3 Drawing Sheets

Radio Protocol Architecture for Dual Connectivity

(56) References Cited

U.S. PATENT DOCUMENTS

| | | | | |
|---|---|---|---|---|
| 2010/0195507 | A1* | 8/2010 | Marinier | H04L 1/20 370/242 |
| 2011/0274038 | A1* | 11/2011 | Zhu | H04W 36/0022 370/328 |
| 2012/0314566 | A1* | 12/2012 | Lee | H04W 76/19 370/225 |
| 2013/0182563 | A1 | 7/2013 | Johansson et al. | |
| 2014/0056243 | A1* | 2/2014 | Pelletier | H04W 72/042 370/329 |
| 2014/0192775 | A1* | 7/2014 | Li | H04W 74/006 370/331 |
| 2014/0362829 | A1* | 12/2014 | Kazmi | H04W 36/22 370/332 |
| 2015/0124743 | A1* | 5/2015 | Damnjanovic | H04W 76/15 370/329 |
| 2015/0124748 | A1* | 5/2015 | Park | H04L 5/0055 370/329 |
| 2015/0215826 | A1* | 7/2015 | Yamada | H04W 36/0072 455/436 |
| 2015/0215965 | A1* | 7/2015 | Yamada | H04W 76/27 370/329 |
| 2015/0358866 | A1* | 12/2015 | Xu | H04W 76/10 370/331 |
| 2016/0150440 | A1* | 5/2016 | Lee | H04W 24/02 455/422.1 |
| 2016/0150485 | A1* | 5/2016 | Yi | H04W 52/34 370/311 |
| 2016/0192269 | A1* | 6/2016 | Kim | H04W 36/0072 370/332 |
| 2016/0234847 | A1* | 8/2016 | Zhang | H04W 48/06 |
| 2016/0242064 | A1* | 8/2016 | Lee | H04W 56/0005 |
| 2016/0286449 | A1* | 9/2016 | Choi | H04W 36/04 |
| 2017/0041983 | A1* | 2/2017 | Jha | H04W 76/28 |
| 2018/0317237 | A1* | 11/2018 | Zhang | H04W 4/50 |
| 2019/0014601 | A1* | 1/2019 | Kim | H04L 1/188 |
| 2019/0174371 | A1* | 6/2019 | Lee | H04W 36/0072 |
| 2019/0364575 | A1* | 11/2019 | Zhang | H04W 4/50 |
| 2020/0296790 | A1* | 9/2020 | Jha | H04W 52/0216 |

OTHER PUBLICATIONS

Pantech, "Analysis of the RLF in dual connectivity," $3^{rd}$ Generation Partnership Project (3GPP), 3GPP TSG-RAN WG2 Meeting #81bis, R2-131100, 5 pages, XP050699421, Chicago, USA, Apr. 15-19, 2013.

"$3^{rd}$ Generation Partnership Project; Technical Specification Group Radio Access; Study on Small Cell enhancements for E-UTRA and E-UTRAN; Higher layer aspects (Release 12)," 3GPP TR 36.842 V12.0.0, pp. 1-71, XP050729403, (Dec. 2013).

International Search Report for PCT/EP2015/055161 dated May 19, 2015.

Kyocera, "Mobility and Reselection issues with CP architectures," 3GPP TSG-RAN WG2 #83, R2-132480, Barcelona, Spain, Aug. 19-23, 2013.

ZTE, "Signalling Flow description for 3C," 3GPP TSG-RAN WG3 #82, R3-132205, San Francisco, California, USA, Nov. 11-15, 2013.

Alcatel Lucent, "Discussion on Special Scell (SPcell) change procedure," 3GPP TSG-RAN WG2 #85, R2-140749, Prague, Czech Republic, Feb. 10-14, 2014.

NTT Docomo, Inc., Introduction of Dual Connectivity, 3GPP TSG-RAN WG2 #85, R2-140906, Feb. 10-14, 2014.

* cited by examiner

Radio Protocol Architecture for Dual Connectivity legacy RRC connection re-establishment procedure and DRB resumption RRC connection re-establishment and resumption of DRB procedure involving the maintaining the SeNB (e.g. RRC connection re-establishment to the same eNB).

RRC connection re-establishment and resumption of DRB procedure involving the release of SeNB (e.g. RRC connection re-establishment to a different eNB).

DUAL CONNECTIVITY NETWORK

FIELD OF THE INVENTION

The present invention relates to a user equipment method, user equipment, a base station method, a base station and computer program products.

BACKGROUND

Wireless telecommunication systems are known. In such systems, mobile communication devices known as user equipment (for example, mobile telephones) are operable to communicate with base stations provided by network providers.

In known wireless telecommunication systems, radio coverage is provided to network connectable devices, such as mobile telephones, or wireless devices such as iPads or other similar tablets, within areas known as cells. A base station is located in each cell to provide radio coverage. Typically, network connectable devices in each cell are operable to receive information and data from a base station and to transmit information and data to a base station.

User equipment roam through the wireless communications system. A number of base stations are provided and are distributed geographically in order to provide a wide area of coverage to user equipment.

When user equipment is within an area served by a base station, communications may be established between the user equipment and the base station over associated radio links. Each base station typically supports a number of sectors within the geographical area of service. Typically, a different antenna within a base station supports each associated sector. Each base station has multiple antennas.

Traditional base stations provide coverage in relatively large geographical areas and those cells are often referred to as macro cells. It is possible to provide a heterogeneous network (hetnet) where smaller sized cells are provided within macro cells. Such smaller sized cells are sometimes referred to as micro cells, pico cells or femto cells. One way to establish a small cell is to provide a small cell base station that provides coverage having a relatively limited range within the coverage area of the macro cell. The transmission power of a small cell base station is relatively low and, hence, each small cell provides a small coverage area compared to that of a macro cell and covers, for example, an office or a home.

Such small cells are typically provided where the communications coverage provided by the macro cell is poor or where a user wishes to use an alternative communications link provided locally, by the small cell base station, to communicate with the core network, and/or to increase capacity within a network.

Deployment of small cells in a wireless communication network can assist a network in relation to handling capacity in high traffic areas, for example, so-called hot spot areas. An ability to offload traffic to a small cell or cells located in a high traffic area of a network may be particularly useful to a network operator. In some cases, "dual connectivity" may be offered such that a user is configured to allow communication with two base station such as, for example, a macro cell base station and a small cell base station. A number of dual connectivity implementations can be configured, each may offer different benefits.

Although dual connectivity deployments may offer advantages, unexpected consequences of such deployments may occur. It is desired to address those consequences.

SUMMARY

According to a first aspect, there is provided a user equipment method, comprising: in response to a radio resource control connection re-establishment procedure being initiated when operating in a dual-connectivity mode, retaining configuration information of at least one data bearer utilised in the dual-connectivity mode for subsequent re-use.

The first aspect recognises that one aspect of dual connectivity is that data radio bearers are established from at least two base stations, a master eNB (MeNB) and at least one secondary eNB (SeNB). Having data radio bearers established to/from the SeNB creates issues on how to handle radio resource control (RRC) connection re-establishment while dual connectivity is configured. Current techniques cause the user equipment to release configured secondary cells (SCell) provided by the SeNB prior to the initiation of the RRC connection re-establishment procedure. However, the release of SeNB (the SeNB being another SCell) results in the release of evolved packet system (EPS) bearers at the user equipment which causes the loss of bearer configuration. Accordingly, a wireless telecommunications network user equipment method may be provided. The method may comprise the step of, in response to, or when a radio resource control connection re-establishment procedure is initiated for user equipment configured or operating in a dual connectivity mode or state, retaining, storing, keeping or maintaining configuration information or parameters of or relating to at least one data bearer used in the dual connectivity mode. The retained configuration information may then be subsequently re-used by the user equipment. In this way, rather than losing all the data radio bearer configuration during the RRC connection re-establishment procedure, some of this bearer configuration is retained so that it may be subsequently re-used, thereby improving the speed and efficiency of the RRC connection re-establishment procedure.

In one embodiment, the at least one data bearer comprises a data radio bearer of a master base station. Accordingly, the data bearer may be a data radio bearer; that is to say, a bearer that carries user data rather than configuration data provided from a base station designated as a master base station.

In one embodiment, the at least one data bearer comprises a split data radio bearer of the master base station. Accordingly, the data bearer may be that component of the split data radio bearer provided by the master base station.

In one embodiment, the configuration information comprises evolved packet system bearer identifiers for released data radio bearers. Accordingly, the configuration information may comprise the identifiers which identify the evolved packet system bearers which are associated with data radio bearers which have been released in response to the radio resource control connection re-establishment procedure.

In one embodiment, the method comprises re-associating the evolved packet system bearer identifiers with re-established data radio bearers. Accordingly, when radio data bearers to carry data are re-established, the evolved packet system bearer identifiers may be used to re-associate the evolved packet system bearers with those re-established data radio bearers.

In one embodiment, the at least one data bearer comprises data radio bearers of a secondary base station special cell.

Accordingly, the data bearer may comprise those data radio bearers provided by a station operating as a secondary base station special cell.

In one embodiment, the at least one data bearer comprises at least one of split data radio bearers and secondary base station cell group bearers of the secondary base station special cell. Accordingly, the data bearer may comprise the split data radio bearers and/or the secondary base station cell group bearers provided by a base station operating as the secondary base station special cell.

In one embodiment, the method comprises receiving and applying a change to the configuration information. Accordingly, an indication of a change in the retained configuration information may be received and the configuration information may be altered and updated by applying that change.

In one embodiment, the method comprises communicating using the at least one data bearer with the configuration information.

According to a second aspect, there is provided user equipment, comprising: retention logic operable, in response to a radio resource control connection re-establishment procedure being initiated when operating in a dual-connectivity mode, to retain configuration information of at least one data bearer utilised in the dual-connectivity mode for subsequent re-use.

In one embodiment, the at least one data bearer comprises a data radio bearer of a master base station.

In one embodiment, the at least one data bearer comprises a split data radio bearer of the master base station.

In one embodiment, the configuration information comprises evolved packet system bearer identifiers for released data radio bearers.

In one embodiment, the user equipment comprises bearer logic operable to re-associate the evolved packet system bearer identifiers with re-established data radio bearers.

In one embodiment, the at least one data bearer comprises data radio bearers of a secondary base station special cell.

In one embodiment, the at least one data bearer comprises at least one of split data radio bearers and secondary base station cell group bearers of the secondary base station special cell.

In one embodiment, the retention logic is operable to receive and apply a change to the configuration information.

In one embodiment, the user equipment comprises communicating logic operable to communicate using the at least one data bearer with the configuration information.

According to a third aspect, there is provided a base station method, comprising: in response to a radio resource control connection re-establishment procedure being initiated when operating in a dual-connectivity mode, retaining configuration information of at least one data bearer utilised in the dual-connectivity mode for subsequent re-use.

In one embodiment, the base station comprises a master base station and the at least one data bearer comprises a data radio bearer of the master base station.

In one embodiment, the at least one data bearer comprises a split data radio bearer of the master base station.

In one embodiment, the configuration information comprises evolved packet system bearer identifiers for released data radio bearers.

In one embodiment, the at least one data bearer comprises data radio bearers of a secondary base station special cell.

In one embodiment, the at least one data bearer comprises at least one of split data radio bearers and secondary base station cell group bearers of the secondary base station special cell.

In one embodiment, the method comprises requesting a modification to at least one data radio bearer of a secondary base station.

In one embodiment, the method comprises receiving an indication of the modification and communicating the modification to user equipment.

In one embodiment, the modification comprises a release of the at least one data radio bearer.

In one embodiment, the method comprises receiving and applying a change to the configuration information.

In one embodiment, the method comprises communicating using the at least one data bearer with the configuration information.

According to a fourth aspect, there is provided a base station, comprising: retention logic operable, in response to a radio resource control connection re-establishment procedure being initiated when operating in a dual-connectivity mode, to retain configuration information of at least one data bearer utilised in the dual-connectivity mode for subsequent re-use.

In one embodiment, the base station comprises a master base station and the at least one data bearer comprises a data radio bearer of the master base station.

In one embodiment, the at least one data bearer comprises a split data radio bearer of the master base station.

In one embodiment, the configuration information comprises evolved packet system bearer identifiers for released data radio bearers.

In one embodiment, the at least one data bearer comprises data radio bearers of a secondary base station special cell.

In one embodiment, the at least one data bearer comprises at least one of split data radio bearers and secondary base station cell group bearers of the secondary base station special cell.

In one embodiment, the base station comprises requesting logic operable to request a modification to at least one data radio bearer of a secondary base station.

In one embodiment, the base station comprises reception logic operable to receive an indication of the modification and communicate the modification to user equipment.

In one embodiment, the modification comprises a release of the at least one data radio bearer.

In one embodiment, the retention logic is operable to receive and apply a change to the configuration information.

In one embodiment, the base station comprises communicating logic operable to communicate using the at least one data bearer with the configuration information.

According to a fifth aspect, there is provided a computer program product operable, when executed on a computer, to perform the method steps of the first or third aspects.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Figure 1:
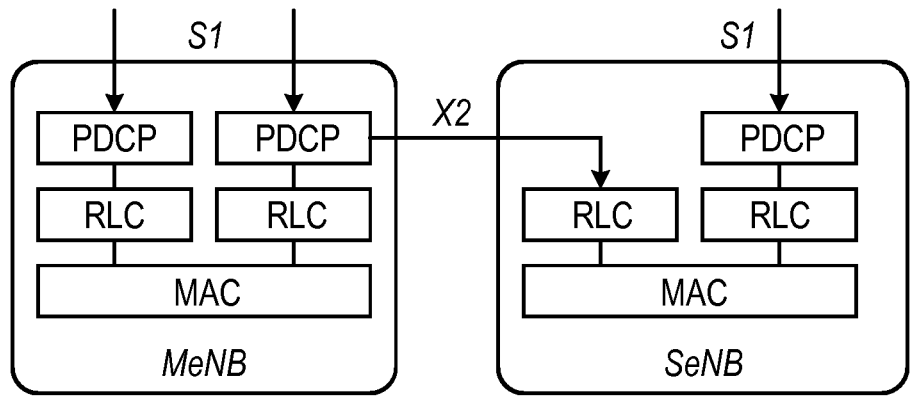
FIG. 1 illustrates user equipment when operating with dual connectivity.

Before discussing the embodiments in any more detail, first an overview will be provided. Embodiments provide a modified radio resource control (RRC) connection re-establishment procedure for user equipment which are configured with so-called "dual connectivity". It will be appreciated that dual connectivity is possible for some user equipment and base stations supporting this arrangement whereby data radio bearers (DRB) which carry user (U-plane) data may be provided from both a master base station (MeNB) and one or more secondary base stations (SeNB). Embodiments retain, maintain, keep or store information relating to the configuration of one or more of the bearers utilised for such dual connectivity for future use in order to improve the speed and efficiency of the RRC connection re-establishment procedure. This is in contrast to existing techniques whereby the configuration is not retained since the user equipment releases certain bearers prior to the initiation of the RRC connection re-establishment procedure.

In one arrangement, configuration information relating to the SeNB is maintained during the RRC connection re-establishment procedure. For example, configuration information relating to data radio bearers provided by that SeNB operating as a so called "special cell" is maintained for future use. Hence, the configuration of data radio bearers of the SeNB is maintained and the data radio bearers are suspended during the RRC connection re-establishment procedure. All lower protocol layers such as the packet data convergence protocol (PDCP), radio link control (RLC), medium access control (MAC) and the physical layer (PHY) is re-set at the SeNB. All other secondary cells of the secondary cell group (SCG) are then released or deactivated either autonomously or explicitly. The SeNB cell and data radio bearers of the SeNB are configured or released explicitly by the network as part of the RRC connection re-establishment procedure signalling. However, if the data radio bearers of the special cell are to be reused, then the user equipment will already have this configuration information when the suspended data radio bearers are resumed.

In another arrangement, the configuration of the SeNB is released during the RRC connection re-establishment procedure. The user equipment autonomously releases the SeNB and all of the SCG cells, including the data radio bearers associated with the SeNB. However, the user equipment maintains information relating to the configuration of the data radio bearers of the MeNB. In addition, the user equipment maintains the evolved packet system (EPS) bearer identifiers of all data radio bearers associated with the SeNB which are suspended and these are kept during the RRC connection re-establishment procedure, even when the data radio bearers are released. For so-called "split bearers" where a data radio bearer is provided from both the MeNB and a SeNB, a specified "default" or "fallback" bearer configuration is applied or the bearer released. When the data radio bearers of the SeNB are re-established as part of the RRC connection re-establishment signalling, these are associated with the appropriate EPS bearer using the maintained EPS bearer identifiers.

RRC Connection Re-Establishment

Figure 2:
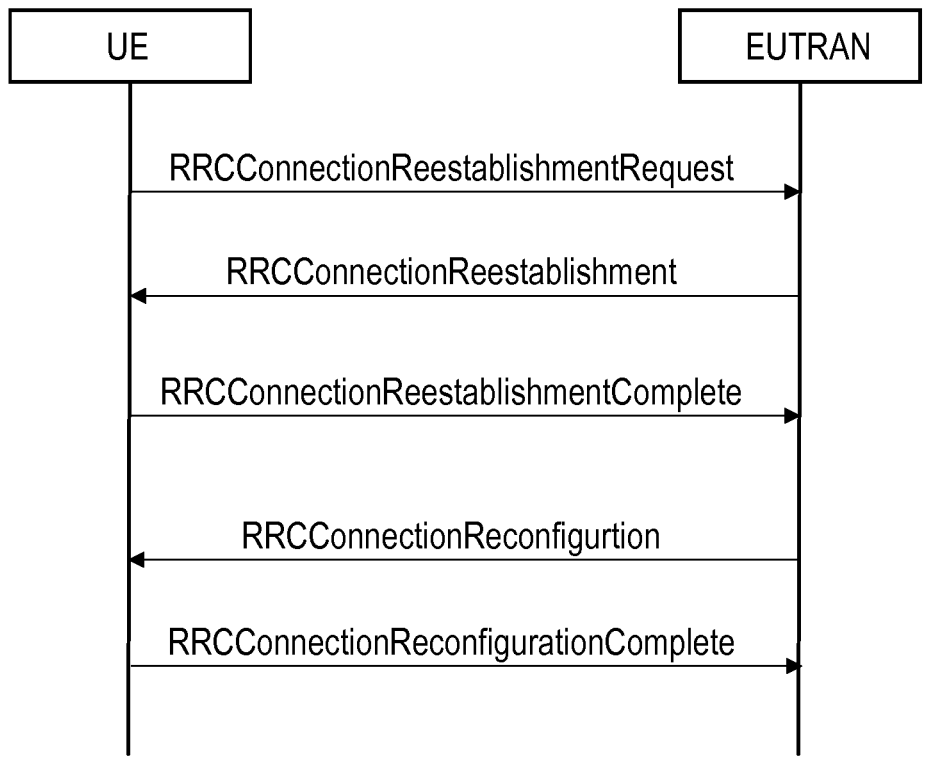
FIG. 2 illustrate the signalling flow involved in the existing RRC connection re-establishment procedure.

Before discussing the embodiments in any more detail, an overview of the existing RRC connection re-establishment procedure will be provided. FIG. 2 shows the signalling flow involved in the existing RRC connection re-establishment procedure. The RRC connection re-establishment procedure is triggered by the user equipment upon detecting a radio link failure, a handover failure, a mobility from the evolved universal terrestrial radio access network (E-UTRAN) failure, an integrity check failure indication from lower protocol layers or a RRC connection reconfiguration failure. The RRC connection re-establishment procedure is used to reconfigure signalling radio bearer 1 (SRB1), to resume data transfer only for this radio bearer and to activate AS security without changing algorithms. Upon initiation of the RRC connection re-establishment procedure, the user equipment shall 1>stop timer T310, if running;
1>start timer T311;
1>suspend all RBs except SRB0;
1>reset MAC;
1>release the SCell(s), if configured,
1>apply the default physical channel configuration;
1>apply the default semi-persistent scheduling configuration;
1>apply the default MAC main configuration;
1>perform cell selection;

Upon the reception of the RRCConnetionReestablishment message, the UE shall

1>stop timer T301;
1>consider the current cell to be the PCell;
1>re-establish PDCP and RLC for SRB1;
1>perform the radio resource configuration procedure in accordance with the received radioResourceConfigDedicated;
1>resume SRB1;
1>update the $K_{eNB}$ key based on the $K_{ASME}$ key to which the current $K_{eNB}$ is associated, using the nextHopChainingCount value indicated in the RRCConnectionReestablishment message and store the nextHopChainingCount value;
1>derive the $K_{RRCint}$ key, $K_{RRCenc}$ key and the $K_{UPenc}$ key associated with the previously configured integrity algorithm and ciphering algorithm;
1>configure lower layers to activate integrity protection and ciphering using the previously configured algorithm and the $K_{RRCint}$ key $K_{RRCenc}$ key and the $K_{UPenc}$ key immediately, i.e., integrity protection shall be applied to all subsequent messages received and sent by the UE, including the message used to indicate the successful completion of the procedure;
1>set the content of RRCConnectionReestablishmentComplete message as follows:
1>perform the measurement related actions;
1>perform the measurement identity autonomous removal;
1>submit the RRCConnectionReestablishmentComplete message to lower layers for transmission, upon which the procedure ends;

The DRBs are resumed after the reception of RRCConnectionReconfiguration message.

1>if this is the first RRCConnectionReconfiguration message after successful completion of the RRC Connection Re-establishment procedure:

2>re-establish PDCP, RLC for SRB2 and for all DRBs that are established, if any;
2>perform the radio configuration according to the RRCConnectionReconfiguration message.

The existing RRC connection re-establishment procedure suspends and resumes the data radio bearers upon completion of the RRC connection re-establishment procedure. There are three possible data radio bearer types that can be configured for the user equipment when operating in dual connectivity, as illustrated in FIG. 1.

For MeNB cell group (MCG) bearers, the MeNB is U-plane connected to the serving gateway (S-GW) via S1-U and the SeNB is not involved in the transport of user plane data. For split bearers, the MeNB is U-plane connected to the S-GW via S1-U and, in addition, the MeNB and the SeNB are interconnected via X2-U. For SeNB cell group (SCG) bearers, the SeNB is directly connected with the S-GW via S1-U.

The split bearers and SCG bearers have SeNB components in their configuration. If the SeNB is released during the RRC connection re-establishment, then the bearer configuration components for that base station are lost. Since the SCG bearers are only delivered from the SeNB, it is important not to lose the SCG bearers during the RRC connection re-establishment procedure.

SeNB Bearer Configuration Retention

In one arrangement, the user equipment is required to suspend all data radio bearers upon the initiation of the RRC connection re-establishment procedure in a similar manner to the existing procedure mentioned above. However, the user equipment retains the SeNB so-called "special cell" configuration and thus the split bearer and SCG bearer configuration can be maintained at the user equipment during the RRC connection re-establishment procedure. Secondary cells other than the special cell of the SCG may then be released during the RRC connection re-establishment.

It is possible that the user equipment reselects a cell which belongs to the source eNB (i.e., the MeNB to which the user equipment was connected prior to the RRC connection re-establishment trigger). In this scenario, the selected eNB becomes the MeNB.

Figure 3:
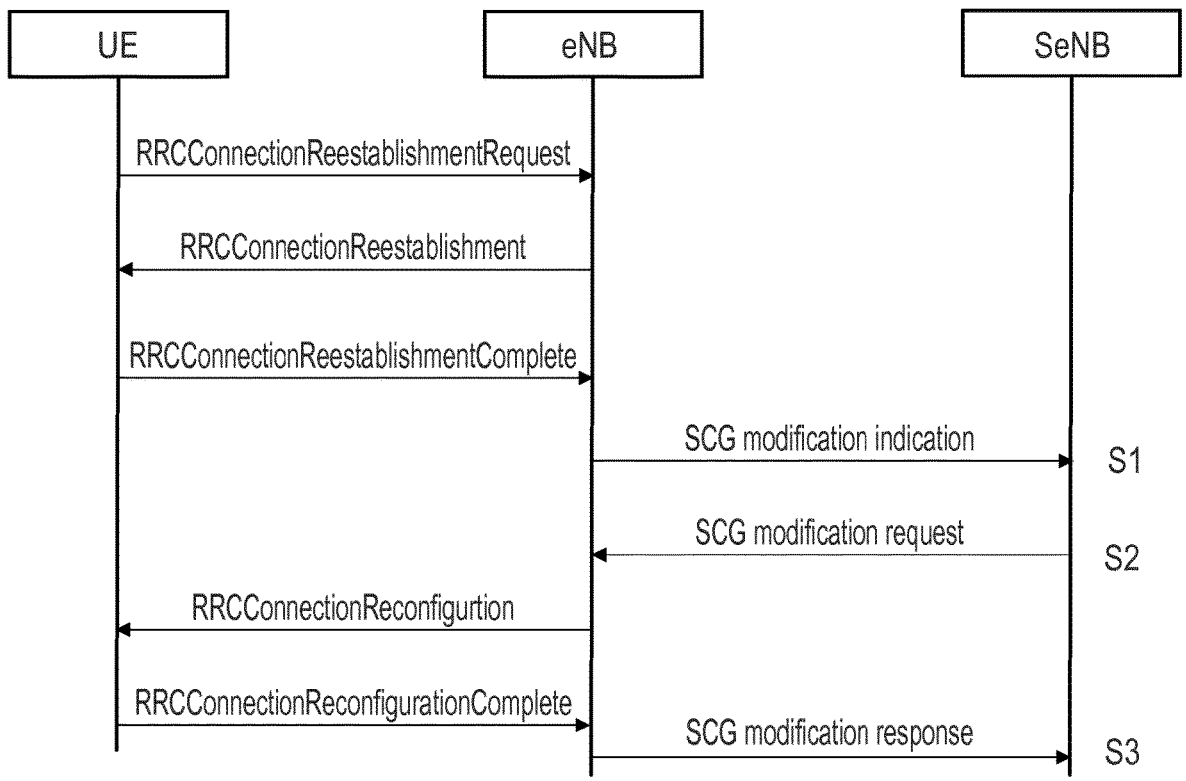
FIGS. 3 and 4 illustrate the signalling flow involved in RRC connection re-establishment procedures of embodiments.

The MeNB can request a new SeNB or reconfigure the SeNB radio configuration for the user equipment. If so, then the MeNB initiates the SCG modification procedure upon the reception of the RRC connection re-establishment complete message from the user equipment, as illustrated in FIG. 3. Accordingly, at step S1, the MeNB determines that a new or reconfigured SeNB is required and so transmits a SCG modification indication to the SeNB. The SeNB then responds at step S2 with a SCG modification request which identifies the configuration made by the SeNB, which may differ to that requested by the MeNB. This is then conveyed by the MeNB using the RRC connection reconfiguration message to the UE. The UE then responds with the RRC connection reconfiguration complete message which identifies the changes made by the user equipment and the MeNB sends a SCG modification response message to the SeNB identifying the configuration of the user equipment to the SeNB at step S3.

The user equipment applies the RRC connection reconfiguration message and performs a synchronisation procedure (i.e., a random access channel (RACH) procedure) towards the SeNB. Following a successful synchronisation procedure, the user equipment resumes the split bearer and SCG bearers towards the SeNB.

Figure 4:
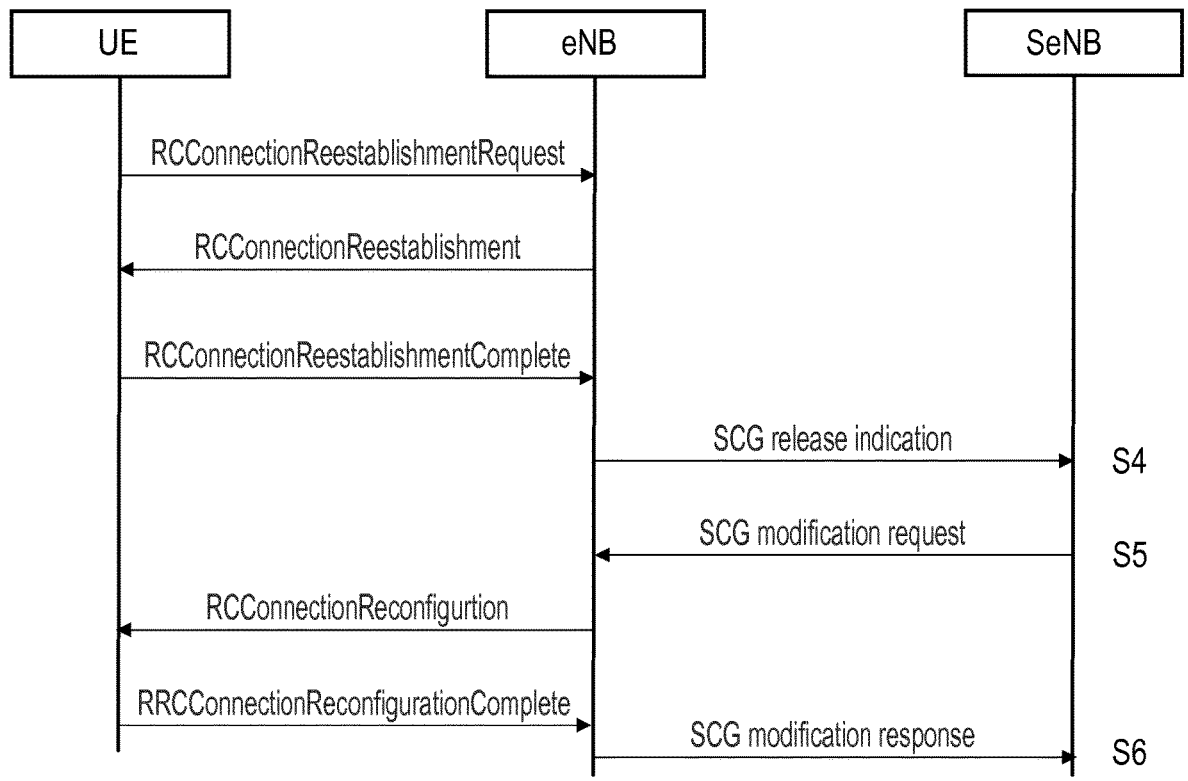

If, however, the user equipment has selected a eNB for reconnection which is different to the source eNB (i.e. is other than the MeNB that the user equipment was connected to prior to the RRC connection re-establishment procedure being triggered) then, upon the reception of the RRC connection re-establishment complete message from the user equipment, the MeNB signals the previous SeNB to release that previous SeNB for the user equipment, as illustrated at step S4 of FIG. 4. The SeNB responds with an SCG modification request at step S5 and, once the RRC connection reconfiguration complete message is received from the user equipment, the MeNB transmits an SCG modification response message to the SeNB at step S6. The RRC connection reconfiguration message, including the new bearer configuration, can be generated by the MeNB to modify or to resume the suspended data radio bearers. Otherwise, the MeNB can release and re-establish the data radio bearers.

For architecture 1A, the release of the SeNB results in the S1-U path being moved to the currently connected base station. The currently connected base station may not have dual connectivity support (for example, it may be a legacy base station). In this case, the base station is not capable of initiating SeNB release. In such a case, the base station releases the corresponding SeNB configuration, including data radio bearers at the SeNB and re-establishes with the appropriate configuration. At the same time, the base station requests the S-GW that the S1-U path be established for all user equipment bearers between the base station and the S-GW.

Accordingly, it can be seen that the base station can take two options, depending on the re-establishment scenario: 1) the resumption or reconfiguration of data radio bearers using the RRC connection reconfiguration message; and 2) the release of all SeNB configuration and corresponding data radio bearers and the re-establishment of the data radio bearers with new configurations.

MeNB Configuration Retention

In one arrangement, the SeNB configuration is released upon the initiation of the RRC connection re-establishment procedure. The user equipment releases any SeNB configuration prior to the initiation of the RRC connection re-establishment procedure. This is a user equipment autonomous procedure and a mechanism is provided to reconfigure the split bearers and SSG bearers at the user equipment. During the RRC connection re-establishment procedure, the network is not aware of whether the user equipment is going through, for example, a radio link failure. Therefore, in order to provide a synchronised mechanism at the user equipment and at the network, a secondary bearer configuration for the SCG and the split bearers to be used at the RRC connection re-establishment is pre-specified.

It will be appreciated that a split bearer has MeNB and SeNB configuration parameters. In the split bearer arrangement, there is one PDCP entity, two RLC entities (corresponding to the MeNB and the SeNB), two MAC entities and separate PHYs. When the SeNB is released during the RRC connection re-establishment procedure, a fallback bearer configuration for the split bearer can be defined which has only MeNB components. This enables the release of the SeNB component of the bearer without losing the complete bearer configuration. This can readily be achieved for downlink bearers. For uplink bearers, additional parameters are configured such as logical channel prioritisation parameters, a prioritised bit rate to be applied for SeNB and MeNB, buffer status report (BSR) configuration, power headroom report (PHR) configuration, and so on. The defined fallback bearer configuration should indicate the corresponding values to be used for PBR, PHR, BSR logical channel group (LCG), and so on.

The fallback bearer can either be indicated in the standards specification as a set of rules or the fallback bearer configuration can be signalled to the user equipment at the bearer establishment/configuration/modification. The user equipment stores the fallback bearer configuration and uses this configuration for the bearer prior to the initiation of the RRC connection re-establishment procedure. This is because the SCG bearers are only served by the SeNB and the bearer configuration may not be visible to the MeNB. One mechanism for retrieving the SCG bearers at the RRC connection re-establishment procedure is to inform the network of the SCG configuration prior to the RRC connection re-establishment.

The following parameters are included in the existing RRC connection re-establishment request message. If the procedure was initiated due to a radio link failure or handover failure, the cell radio network temporary identifier (CRNTI) used in the source P cell where the trigger for the re-establishment occurred, the physical cell identity of the source P cell or the P cell which the trigger for the re-establishment occurred, 16 least significant bits of the message authentication code-integrity (MAC-I) and re-establishment cause. In addition to the included parameters in the existing RRC connection re-establishment request, the SCG information can be included. The additional information could take the following form:
1. Indication of established SCG bearers while in the cell and where the re-establishment trigger occurred. This could be a 1 bit flag to indicate that there were SCG bearer(s) configured for the user equipment.
2. Physical cell identity of the SP cell of the SeNB.
3. The global cell identity of the SP cell of the SeNB prior to the RRC connection re-establishment.
4. Details of the SCG bearer configuration information.

Even though the SeNB and associated data radio bearers are released at the user equipment autonomously in this arrangement, the user equipment keeps the EPS bearer configuration/information stored at the user equipment, but suspends any communication on these EPS bearers. Upon the subsequent data radio bearer configuration parameters after the successful re-establishment, the stored EPS bearer information is used to link the EPS bearers and the data radio bearer configuration.

Upon reception of the RRC connection re-establishment request message from the user equipment, the base station will act as follows to release or reconfigure the SeNB for the user equipment. The following network procedures are applicable for both user equipment behaviour described in both arrangements mentioned above:
1. If the user equipment has reconnected to the same base station as the MeNB where the re-establishment trigger occurred, the MeNB tries to reconfigure the SeNB for the user equipment using SCG modification indication followed by the SCG modification procedure.
2. If the user equipment has reconnected to a different base station than the MeNB where the re-establishment trigger occurred and the base station has dual connectivity capability, the base station initiates the SeNB release procedure upon the reception of the RRC connection re-establishment request message.
3. If the user equipment has reconnected to a different base station than the MeNB where the re-establishment trigger occurred, and the base station does not have dual connectivity capability (for example, it is a legacy base station), the base station does not comprehend the information provided by the user equipment regarding the SeNB. Thus, the base station may not be able to establish bearers which were corresponding to the SCG bearers. In this case, the bearer establishment trigger comes from the mobility management entity (MME) during the S1-U setup for the new base station.

Accordingly, it can be seen that embodiments provide a method and procedure for the RRC connection re-establishment procedure for dual connectivity configured user equipment. Embodiments provide a mechanism for retrieving data bearers established from/to the SeNB(s) during the re-establishment procedure. The existing procedure requires the user equipment to release any SCell at the initiation of the RRC connection re-establishment procedure, which results in losing data radio bearers configured in the SeNB. Embodiments obviate this problem by maintaining the configuration during the RRC connection re-establishment procedure.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method carried out by a user equipment operatively connected to a wireless telecommunications network, said method comprising:
    when a user equipment is operating in a dual-connectivity mode, retaining configuration information at the user equipment for subsequent re-use in response to a radio resource control connection re-establishment procedure being initiated by the user equipment, wherein said retained configuration information is configuration information of at least one data bearer that had been previously utilized in said dual connectivity mode by the user equipment prior to the radio resource control connection re-establishment procedure being initiated;
    wherein said at least one data bearer comprises a data radio bearer comprising at least one of a split data radio bearer and a secondary base station cell group bearer of a secondary base station special cell.

2. The method of claim 1, wherein said at least one data bearer comprises a data radio bearer of a master base station.

3. The method of claim 1, wherein said at least one data bearer comprises a split data radio bearer of said master base station.

4. The method of claim 1, wherein said configuration information comprises evolved packet system bearer identifiers for released data radio bearers.

5. The method of claim 4, comprising re-associating said evolved packet system bearer identifiers with re-established data radio bearers.

6. The method of claim 1, comprising receiving and applying a change to said configuration information.

7. A non-transitory computer readable medium contains a program that is operable, when executed on a computer, to perform the method of claim 1.

8. User equipment for operatively connecting to a wireless telecommunications network, said user equipment comprising:
    at least one processor; and
    at least one memory including computer program code;
    wherein the at least one memory and the computer program code are configured to, with the at least one processor, when the user equipment is operating in a dual-connectivity mode, cause the user equipment to retain configuration information for subsequent re-use in response to a radio resource control connection re-establishment procedure being initiated by the user equipment, wherein said retained configuration information is configuration information of at least one data bearer that had been previously utilized in said dual connectivity mode by the user equipment prior to the radio resource control connection re-establishment procedure being initiated;
    wherein said at least one data bearer comprises a data radio bearer comprising at least one of a split data radio bearer and a secondary base station cell group bearer of a secondary base station special cell.

9. The user equipment of claim 8, wherein said at least one data bearer comprises a data radio bearer of a master base station.

10. The user equipment of claim 8, wherein said at least one data bearer comprises a split data radio bearer of said master base station.

11. The user equipment of claim 8, wherein said configuration information comprises evolved packet system bearer identifiers for released data radio bearers.

12. The user equipment of claim 8, comprising receiving and applying a change to said configuration information.

13. A method carried out by a base station of a wireless telecommunications network, said method comprising:
    when a user equipment is operating in a dual-connectivity mode, retaining configuration information at a base station for subsequent re-use by the base station in response to a radio resource control connection re-establishment procedure being initiated by the user equipment, wherein said retained configuration information is configuration information of at least one data bearer that had been previously utilized in said dual connectivity mode by the user equipment prior to the radio resource control connection re-establishment procedure being initiated;
    wherein said at least one data bearer comprises a data radio bearer comprising at least one of a split data radio bearer and a secondary base station cell group bearer of a secondary base station special cell.

14. The method of claim 13, comprising requesting a modification to at least one data radio bearer of a secondary base station.

15. The method of claim 14, comprising receiving an indication of said modification and communicating said modification to user equipment.

16. The method of claim 14, wherein said modification comprises a release of said at least one data radio bearer.

17. A non-transitory computer readable medium contains a program that is operable, when executed on a computer, to perform the method of claim 13.

18. A base station of a wireless telecommunications network, said base station comprising:
    at least one processor; and
    at least one memory including computer program code;
    wherein the at least one memory and the computer program code are configured to, with the at least one processor, when a user equipment is operating in a dual-connectivity mode, cause the base station to retain configuration information for subsequent re-use by the base station in response to a radio resource control connection re-establishment procedure being initiated by the user equipment, wherein said retained configuration information is configuration information of at least one data bearer that had been previously utilized in said dual connectivity mode by the user equipment prior to the radio resource control connection re-establishment procedure being initiated;
    wherein said at least one data bearer comprises a data radio bearer comprising at least one of a split data radio bearer and a secondary base station cell group bearer of a secondary base station special cell.

19. The base station of claim 18, wherein the base station is configured to request a modification to at least one data radio bearer of a secondary base station;

wherein the base station is configured to receive an indication of said modification and to communicate said modification to said user equipment.

20. The base station of claim 18, wherein the base station is configured to request a modification to at least one data radio bearer of a secondary base station;
   wherein said modification comprises a release of said at least one data radio bearer.

\* \* \* \* \*